Oct. 10, 1961     T. L. HIBBARD     3,003,819
WHEEL AND BRAKE DRUM ASSEMBLY
Filed Jan. 12, 1959
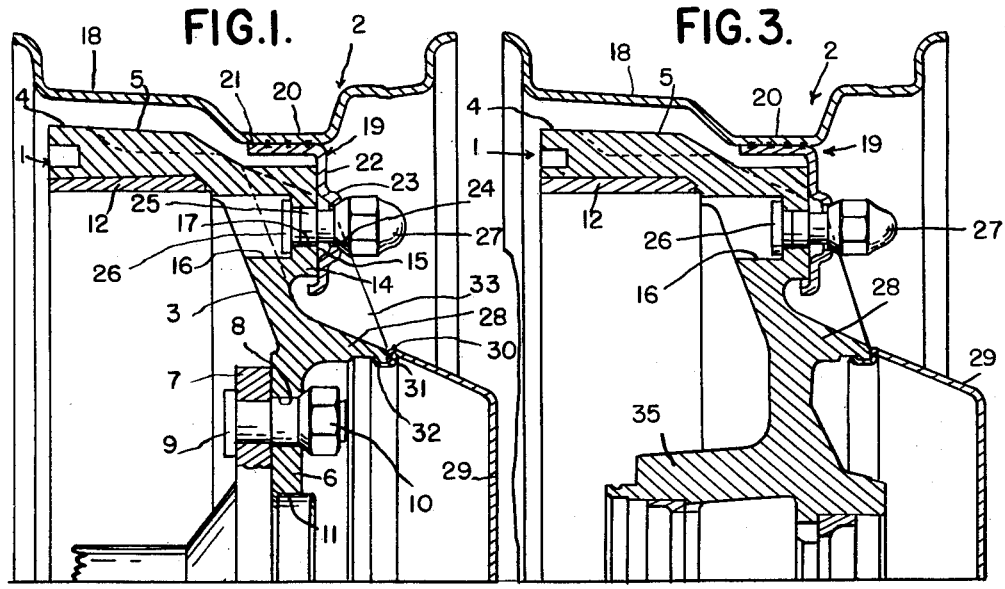
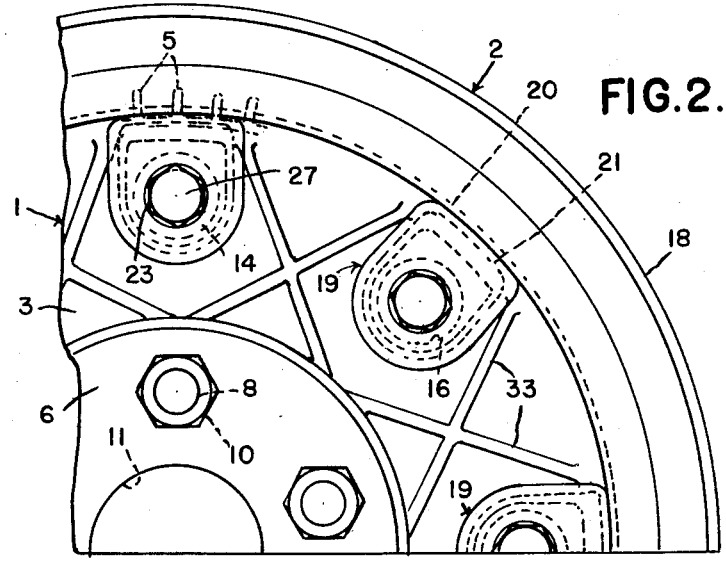
INVENTOR.
THOMAS L. HIBBARD
BY
*Whitemore, Hulbert & Belknap*
ATTORNEYS

United States Patent Office 3,003,819
Patented Oct. 10, 1961

3,003,819
WHEEL AND BRAKE DRUM ASSEMBLY
Thomas L. Hibbard, Birmingham, Mich., assignor to Kelsey-Hayes Company, Detroit, Mich., a corporation of Delaware
Filed Jan. 12, 1959, Ser. No. 786,245
2 Claims. (Cl. 301—6)

This invention relates to wheel and brake drum assemblies and refers more particularly to assemblies of the type in which the wheel structure and brake drum are secured to each other.

The invention has for one of its objects to provide a wheel and brake drum assembly in which the brake drum has an annular flange and a web upon which the wheel structure is mounted, the web having a hub cap retaining formation radially inwardly of the wheel structure.

The invention has for a further object to provide a wheel and brake drum assembly as described above in which the web of the drum is also formed with heat dissipating and reinforcing ribs outwardly of the hub cap retaining formation.

The invention has for another object to provide a wheel and brake drum assembly in which the brake drum is formed of a relatively lightweight material and has high heat transfer characteristics.

The invention has for a still further object to provide a wheel and brake drum assembly as above described so constructed as to have the same outboard appearance whether formed for mounting on a rear axle flange or on a front spindle of a motor vehicle.

Other objects and features of the invention will become apparent as the description proceeds, especially when taken in conjunction with the accompanying drawing, illustrating a preferred embodiment of the invention, wherein:

FIG. 1 is a radial section of a wheel and brake drum assembly embodying the invention.

FIG. 2 is a fragmentary elevation with the hub cap removed, looking in the direction of the arrow 2 in FIG. 1.

FIG. 3 is a view similar to FIG. 1 illustrating a modification.

Referring now more particularly to the drawing, 1 is the brake drum and 2 is the wheel structure. The brake drum is a cast element in the form of a shell having the integral web 3 and annular flange 4 at the radially outer extremity of the web and projecting axially inwardly from the web or to the left as viewed in FIG. 1. The shell is cast of aluminum or magnesium, which are relatively light in weight and have high heat transfer characteristics. While aluminum or magnesium are preferred, other materials having similar characteristics may be employed. The annular flange 4 is formed with a series of circumferentially spaced heat dissipating ribs 5 cast integrally with the flange. The web 3 has a radially inner bolting-on portion 6 for attachment to the rear axle flange 7. The bolting-on portion 6 is formed with a circular series of holes 8 adapted to register with holes in the axle flange to receive bolts 9 which in cooperation with nuts 10 removably clamp the brake drum to the axle flange. The portion 6 of the web has a central aperture 11.

An annular cast-iron liner 12 is bonded to the inner surface of flange 4 for engagement by a suitable friction device, not shown. The brake drum shell may be formed by casting in a sand or permanent mold or by die casting, for example. Preferably the liner 12 is placed in the mold prior to casting and the brake drum shell is cast around the liner. During casting of the shell, a molecular bond is obtained between the liner and shell flange throughout the full 360° of contact. The procedure employed for bonding the liner to the flange forms no part of the present invention but is fully described in an application of Rupert L. Atkin, Serial No. 736,053, filed May 19, 1958.

The web 3 of the drum is also formed near the flange with a plurality of equally circumferentially spaced axially outwardly projecting wheel mounting bosses 14 which terminate in the radial faces 15. The bosses are formed with the axially extending sockets 16 open at the axially inner side of the web and having bolt holes 17 in the bottom wall of the socket.

The wheel structure 2 comprises an annular tire rim 18 and mounting tabs 19. The rim 18 encircles the brake drum and is formed with a well 20. The tabs are spaced apart circumferentially with respect to the rim equal distances corresponding to the spacing between the wheel mounting bosses 14, and each tab has a generally axially extending portion 21 welded to the bottom wall of the rim well 20. Each tab also has the radially inwardly extending portion 22 which is adapted to overlie a boss 14 and which has a central raised portion 23 formed with a hole 24 registering with the bolt hole 17. Bolts 25 extend through the registering holes 17 and 24 with the heads 26 of the bolts seated against the bottoms of the sockets 16, and nuts 27 are threaded on the outer ends of the bolts and bear against the tabs to draw them firmly against the radial surfaces 15 of the bosses 14. By means of the tabs 19, bolts 25 and nuts 27, the rim is detachably secured to the brake drum so that the web of the drum serves the additional function of a well center.

The web is also formed with the integral annular hub cap retaining formation 28 which is generally cylindrical and projects from the web in an axially outward direction. The hub cap 29 has a bead 30 around its margin and spring clips 31 secured to the bead are provided for releasable engagement behind the annular shoulder 32 within the hub cap retaining formation 28. The web has between each pair of adjacent mounting bosses 14 the crossing ribs 33 which are cast intergrally with the drum shell and project axially outwardly. The ribs reinforce and strengthen the wheel and drum assembly and also aid in dissipating heat generated during an application of the brakes. The ribs 33 extend from the hub cap retaining formation 28 to the radially outer extremity of the web.

The web of the brake drum radially outwardly of the hub cap 29 is exposed on the outboard side to provide a wheel body appearance and the hub cap conceals the bolting-on portion 6 of the web.

FIG. 3 illustrates a modification which is exactly like the assembly shown in FIGS. 1 and 2 except that instead of having a bolting-on portion for mounting on a rear axle flange of a motor vehicle, it is formed with an integral hub 35 for mounting on a front spindle. When the hub cap is applied, the assembly of FIG. 3 has the same outboard appearance as that shown in FIGS. 1 and 2.

As pointed out above, the drum shells (in FIGS. 1 and 3) are preferably aluminum or magnesium because of the high heat transfer characteristics of these materials. The drum web and ribs 33 are exposed on the outboard side for maximum heat transfer. Moreover the exposed web gives the appearance of a full aluminum wheel, where aluminum is used.

What I claim as my invention is:

1. In a wheel and brake drum assembly, a brake drum comprising a shell formed of a relatively lightweight material having high heat transfer characteristics, said shell having a web and an annular flange at the radially outer extremity of said web propecting from said web in an axially inward direction, said web serving also as a wheel center and having an integral annular hubcap retaining formation spaced radially inwardly of said flange, said formation projecting from said web in an axially outward direction, a wheel structure comprising a rim and mounting tabs carried by said rim in circumferentially spaced relation, said tabs having axial flanges permanently secured to the underside of the rim base and radial flanges projecting radially inwardly from said axial flanges, said web having integral bosses between said drum flange and said formation projecting from said web in an axially outward direction in circumferentially spaced relation corresponding to the spacing of said tabs, said bosses terminating in radial mounting faces, fasteners for detachably mounting the radial flanges of said tabs on the radial faces of said bosses with the axial flanges of said tabs overlying said bosses, said web having an integral hub portion disposed radially inwardly of said hubcap retaining formation for mounting said drum on a spindle, said web also having integral reinforcing and heat dissipating ribs between said bosses and radially outwardly of said formation projecting from said web in an axially outward direction, the portion of said web radially outwardly of said hubcap retaining formation being exposed on the outboard side for maximum cooling and to present a wheel body appearance.

2. In a wheel and brake drum assembly, a brake drum comprising a shell formed of a relatively lightweight material having high heat transfer characteristics, said shell having a web and an annular flange at the radially outer extremity of said web projecting from said web in an axially inward direction, said web serving also as a wheel center and having an integral annular hubcap retaining formation spaced radially inwardly of said flange, said formation projecting from said web in an axially outward direction, a wheel structure comprising a rim and mounting tabs carried by said rim in circumferentially spaced relation, said tabs having axial flanges permanently secured to the underside of the rim base and radial flanges projecting radially inwardly from said axial flanges, said web having integral bosses between said drum flange and said formation projecting from said web in an axially outward direction in circumferentially spaced relation corresponding to the spacing of said tabs, said bosses terminating in radial mounting faces, fasteners for detachably mounting the radial flanges of said tabs on the radial faces of said bosses with the axial flanges of said tabs overlying said bosses, said web having an integral bolting-on portion diposed radially inwardly from said hubcap retaining formation for mounting said drum on an axial flange, said web also having integral reinforcing and heat dissipating ribs between said bosses and radially outwardly of said formation projecting from said web in an axially outward direction, the portion of said web radially outwardly of said hubcap retaining formation being exposed on the outboard side for maximum cooling and to present a wheel body appearance.

References Cited in the file of this patent

UNITED STATES PATENTS

| | | |
|---|---|---|
| 1,439,269 | Siddeley | Dec. 19, 1922 |
| 1,934,443 | Norton | Nov. 7, 1933 |
| 1,965,204 | Sinclair | July 3, 1934 |
| 2,051,501 | Sorsensen | Aug. 18, 1936 |
| 2,150,111 | Tatter | Mar. 7, 1939 |